(12) United States Patent
Zimmer et al.

(10) Patent No.: US 7,318,150 B2
(45) Date of Patent: Jan. 8, 2008

(54) SYSTEM AND METHOD TO SUPPORT PLATFORM FIRMWARE AS A TRUSTED PROCESS

(75) Inventors: Vincent J. Zimmer, Federal Way, WA (US); Willard M. Wiseman, Vernonia, OR (US); Jing Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 495 days.

(21) Appl. No.: 10/786,284

(22) Filed: Feb. 25, 2004

(65) Prior Publication Data

US 2005/0262571 A1 Nov. 24, 2005

(51) Int. Cl.
*G06F 9/00* (2006.01)
(52) U.S. Cl. .......................................... 713/2; 726/27
(58) Field of Classification Search ................. 726/27; 713/2
See application file for complete search history.

(56) References Cited

U.S. PATENT DOCUMENTS 6,988,250 B1 * 1/2006 Proudler et al. ............... 716/1
7,065,654 B1 * 6/2006 Gulick et al. ............... 713/193
7,069,439 B1 * 6/2006 Chen et al. ................. 713/172
2004/0073806 A1 * 4/2004 Zimmer ...................... 713/189
2005/0138393 A1 * 6/2005 Challener et al. ........... 713/186

* cited by examiner

*Primary Examiner*—Nasser Moazzami
*Assistant Examiner*—Carlton V Johnson
(74) *Attorney, Agent, or Firm*—Blakely, Sokoloff, Taylor & Zafman LLP (57) ABSTRACT

A system and method to support platform firmware as a trusted process. Measurement of a trusted portion of original firmware are measured by a core root of trust measurement (CRTM). The measurement is stored in a secure manner during pre-boot. During operating system (OS)-runtime, requests are made to access an unqualified current version of firmware corresponding to a secure execution mode. A portion of the current firmware analogous to the trusted portion is measured. The measurements of the trusted original portion and unqualified current portion are compared to verify they match. If they match, it indicates that the current portion and the trusted portion are one in the same. Thus, the current portion of firmware is trustworthy. Accordingly, the firmware may be executed as a trusted process. Embodiments employ locality to enforce the trusted process. The use of locality prevents unqualified users (i.e., software) from accessing data stored by trusted firmware.

26 Claims, 8 Drawing Sheets

SYSTEM AND METHOD TO SUPPORT PLATFORM FIRMWARE AS A TRUSTED PROCESS

FIELD OF THE INVENTION

The field of invention relates generally to computer systems and, more specifically but not exclusively relates to techniques for supporting execution of platform firmware as a trusted process.

BACKGROUND INFORMATION

The past few years have seen an ever-increasing level of attacks on computer systems and servers. Malicious hackers spend hours on end trying to identify security holes via which they can embed viruses, Trojans, etc. Almost as soon as an operating system (OS) vendor publishes a security patch to defeat a particular attack scheme, the hackers have figured out another way to defeat the software. Once viruses and the like appear on servers, an entire network of computers is susceptible to attack by those viruses.

In addition to malicious attacks in which the intent is to cause widespread system damage, networks are also prone to security breaches that enable data to be "stolen." For example, recent attacks have been made on various electronic storefront servers to steal credit card information and other user information. These types of attacks have lead to an escalating need for substantially improved security measures.

In view of the severity and frequency of the foregoing, a new direction has been proposed to replace today's security paradigm. A more proactive approach to security is presently being designed into the next generation of operating systems, which are referred to as trusted operating systems (TOS), secure operating systems (SOS), and secure and trusted operating systems (STOS). As stated in an *NSA Operating System Security Paper, NISSC*, October 1998, "Current security efforts suffer from the flawed assumption that adequate security can be provided in applications with the existing security mechanisms of mainstream operating systems. In reality, the need for secure operating systems is growing in today's computing environment due to substantial increases in connectivity and data sharing. The threats posed by the modern computing environment cannot be addressed without secure operating systems. Any security effort which ignores this fact can only result in a 'fortress built upon sand'."

In contrast to today's scheme of security mechanisms layered over an unsecure core (e.g., a mainstream OS), the new approach begins with a trusted core that may only be accessed by users having appropriate security credentials. In this context, it is noted that users are not limited to humans, but rather also include programmatic entities such as software applications and the like. A chain of trust is maintained by the TOS or STOS to ensure that only trustworthy users may access secured portions of the OS, while other unsecure portions do not require the same level of authentication to access. The end result is that unqualified access is denied.

While efforts are being made to dramatically enhance operating system security, there are no commensurate endeavors that have been directed at system firmware. Although less susceptible to attacks than software, there are still situations under which system firmware may be attacked. In general, an attack may be direct (e.g., immediate deletion or corruption of critical BIOS components), or latent (e.g., a firmware Trojan to be activated at a future time). While operating systems attacks are generally somewhat recoverable, a firmware attack may be fatal. Consider, an errant operating system can be replaced, while errant firmware may totally disable a system or server.

Another aspect of firmware security relates to trusted processes. STOS's provide mechanisms to ensure all secure software processes are trusted. There are no equivalent mechanisms for ensuring firmware processes are trusted; as such, firmware is deemed to be untrustworthy. For example, various firmware architectures support "hidden" firmware operations during operating system runtime. Depending on the particular architecture, these runtime firmware operations may have access to all of a system's resources, including the full memory address space. Thus, malicious firmware may cause havoc to operating systems an/or applications by modifying (e.g., deleting, replacing) portions of memory that are thought to be secured by the TOS or STOS.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of systems and methods for supporting platform firmware as a trusted process are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments disclosed herein, trusted firmware processes are effectuated via trusted platform technology in combination with a secure authentication credential storage scheme. These security measures ensure the trustworthiness of firmware, while preventing attacks via execution of malicious firmware.

Figure 1:
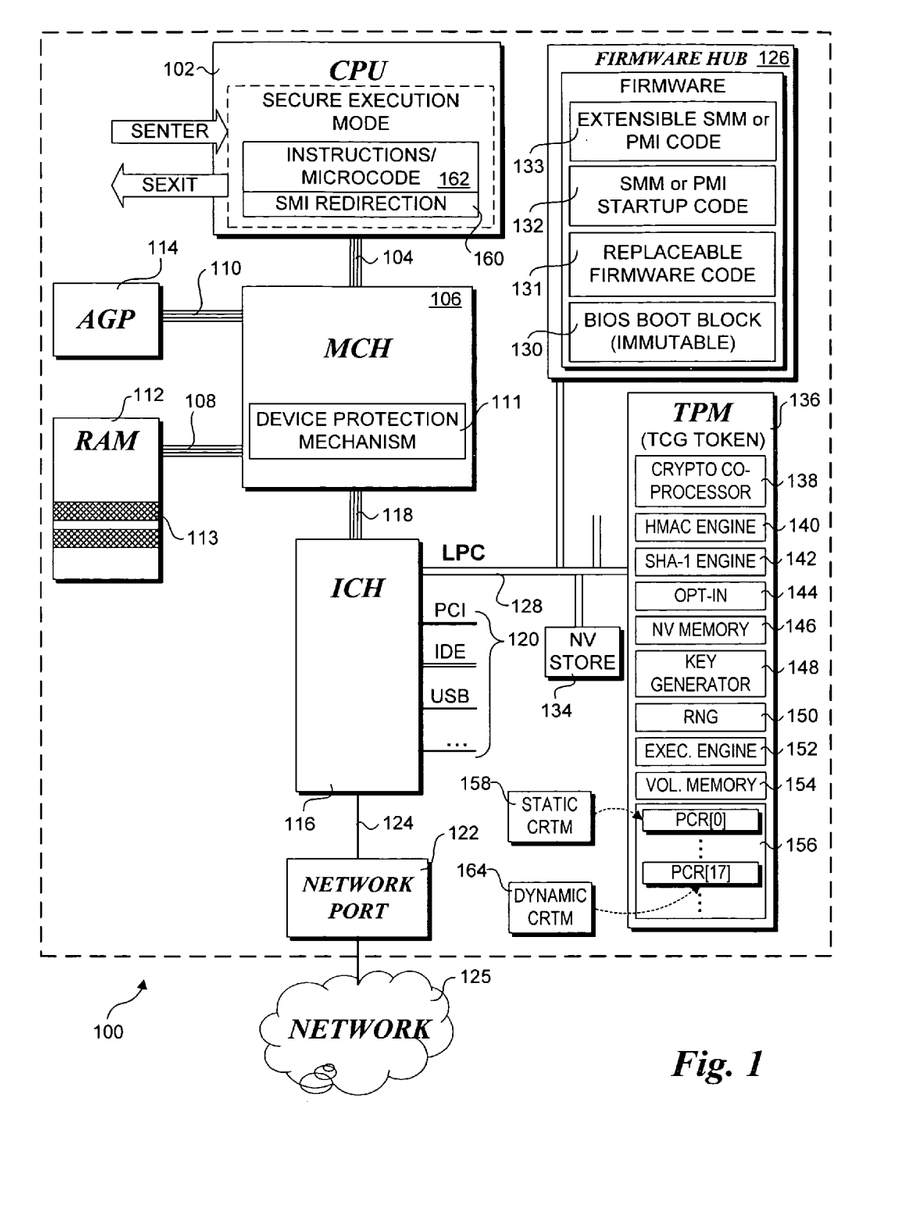
FIG. 1 is a schematic diagram of an exemplary platform configuration via which embodiments of the invention may be implemented.

An exemplary computer architecture 100 suited for implementing embodiments of the invention described herein is shown in FIG. 1. The architecture includes a processor 102 coupled, via a bus 104, to a memory controller hub (MCH) 106, commonly referred to as the "Northbridge" under well-known Intel® chipset schemes. MCH 106 is coupled via respective buses 108 and 110 to system memory (i.e., RAM) 112 and an advanced graphics port (AGP) 114. MCH 106 provides memory control functions, and includes a device protection mechanism 111 that enables access to protected memory pages 113 in system memory 112. MCH 106 is further coupled to an Input/Output (I/O) controller hub (ICH) 116 via a bus 118. The ICH, which is commonly referred to as the "Southbridge," provides a hardware interface to various I/O buses, ports and devices, depicted as items 120. These include a PCI bus, and IDE interface, a universal serial bus (USB), etc. ICH 116 is further coupled to a network port 122 via an I/O path 124. In turn, the network port 122 may be coupled to a network 125.

The architecture 100 of FIG. 1 also includes a firmware hub 126 coupled to ICH 116 via a low pin count (LPC) bus 128, which is configured per Intel LPC Interface Specification Revision 1.0, Sep. 29, 1997. The firmware hub includes various firmware components, including a BIOS boot block 130 and replaceable or modular firmware code 131. The architecture may include a non-volatile (NV) store 134 in which non-volatile data used by the firmware and/or other components may be stored.

In accordance with one aspect of the embodiments, a Trusted Computing Group (TCG) (http://www.trustedcomputinggroup.org) security scheme is implemented to store and retrieve security-related data. In the embodiment of FIG. 1, a TCG token comprising a trusted platform module (TPM) is employed. Generally, TPM functionality may be embodied as a hardware device (most common) or via software. For example, Integrated circuits have been recently introduced to support TPM functionality, such as National Semiconductor's LPC-based TCG-compliant security controller. Such an integrated circuit is depicted as a TPM 136 in FIG. 1.

TCG is an industry consortium concerned with platform and network security. The TCG main specification (Version 1.2, October, 2003—hereinafter referred to as the "version 1.2 specification") is a platform-independent industry specification that covers trust in computing platforms in general. The TCG main specification defines a trusted platform subsystem that employs cryptographic methods when establishing trust. The trusted platform may be embodied as a device or devices, or may be integrated into some existing platform component or components. The trusted platform enables an authentication agent to determine the state of a platform environment and seal data particular to that platform environment. Subsequently, authentication data (e.g., integrity metrics) stored in a TPM may be returned in response to an authentication challenge to authenticate the platform.

A "trusted measurement root" measures certain platform characteristics, logs the measurement data, and stores the final result in a TPM (which contains the root of trust for storing and reporting integrity metrics). When an integrity challenge is received, the trusted platform agent gathers the following information: the final results from the TPM, the log of the measurement data from the trusted platform measurement store, and TCG validation data that states the values that the measurements should produce in a platform configured in accordance with the configuration that existed at the time the integrity measurements were sealed. The operations of making an identity and enabling key-pair for the pre-boot environment enables TPM functionality to be employed for authentication purposes during and after pre-boot. Further details concerning the use of TPM 136 are discussed below.

TPM 136 provides several functions relating to security. These include an cryptographic co-processor 138, an HMAC (Hashing for Message Authentication Codes) engine 140, and SHA (security hash algorithm)-1 engine 142, an Opt-In component 144, non-volatile memory 146, a key generator 148, a random number generator (RNG) 150, an execution engine 152, volatile memory 156, and Platform Configuration Registers (PCRs) 156. Also provided in one TPM embodiment but not shown are an input/output component and a power detection component.

Generally, a TPM by itself provides a baseline level of security for storing and accessing trust-related data and authentication measures. Under TPM Main Specification, Part 1 Design Principles (Oct. 2, 2003) a TPM is to be an independent device that is not susceptible to tampering or incorrect usage. Accordingly, to further enhance this baseline security, an embodiment of the invention implements a hidden access mechanism that enables access to TPM 136 via special bus cycles invoked on low pin count (LPC) bus 128.

In order to provide for trust processes, there must be a mechanism to ensure that security-related data, such as secrets (e.g., keys, certificates, etc.) may not be accessed by unqualified users. In the context of TPM usage, users may comprise software, firmware or hardware; for convenience, all users are generally referred to as software. The TPM architecture addresses this aspect using a mechanism referred to as "locality." The concept of locality was introduced in the TPM Main Specification version 1.2. Locality allows for Dynamic RTMs in addition to static RTMs. Locality also allows more that one simultaneous root of trust to exist per platform operational state.

The idea behind locality is that certain combinations of software and hardware are allowed more privileges than other combinations. This is enforced by a hierarchical access structure. For instance, the highest level of locality might be cycles that only hardware could create. Since the hardware is virus-proof (at least in theory), it has a higher level of trust than cycles code generates. Under the version 1.2 specification, Locality 4 is the highest level defined. These cycles are generated by hardware. This would include things like TPM_PCR_Reset or the TPM_HASH_* LPC commands. The hardware guarantees that the TPM_PCR_RESET or HASH operations occurred, and that the correct data was sent.

Next, consider the case of a platform that has both: 1) software based on either using no PCRs or a set of resettable PCRs (the OS based on the Static RTM or Static OS); and 2) trusted software (i.e., a trusted OS). In this case, there is a need to differentiate cycles from the OS's. Localities 1-3 may be used by the TOS for its transactions. The version 1.2 specification includes definitions for new resettable PCRs assigned to specific localities. Only trusted software should be able to issue commands based on those PCRs. This software is locality 1-3 software.

With reference to the flowchart of FIG. 2, in one embodiment a platform is initialized to support a trusted firmware process effectuated via locality in the following manner. The process starts in a block 200 in response to a restart event. A restart event implies the system has been restarted, such as via a cold boot or system reset (a.k.a., warm boot). In response, processor, chipset, and memory initialization operations are performed. These include initializing the platform memory and I/O complex, as depicted in a block 202.

Next, a determination is made to whether the platform has a TPM in a decision block 204. In order to enforce trustworthiness, there must be some component(s) that are inherently deemed trustworthy. This component or components are used to derive the core root of trust measurement (CRTM). A CRTM is the basis for all subsequent trust measurements. The TPM is used to store these measurements.

If a TPM exists, the answer to decision block 204 is YES, and the logic proceeds to a block 206. In this block, the TPM_STARTUP command is issued. A static CRTM is then created via a measurement of the platform's base firmware. The base firmware is a portion of firmware provided by the platform that cannot be partially replaced. The CRTM must be an immutable portion of the platform's initialization code that executes upon any platform reset. The trust in the platform is based on the CRTM. The trust in all measurements is based on the integrity of this component. Thus, the static CRTM is derived from a measurement of "static" firmware.

Currently, in a PC, there are at least two types of static CTRM architectures. The first CRTM architecture measures the BIOS boot block 130 (a.k.a., firmware boot block or trusted boot block). In this architecture, the firmware is composed of the BIOS boot block and a POST (power-on self-test) BIOS. These are individual components and each can be updated independent of the other. In this architecture, the BIOS boot block is the CRTM while the POST BIOS is not, but is a measured component of the Chain of Trust. If there are multiple execution points for the BIOS boot block, they must all be within the CRTM.

Under a second architecture, the CRTM is measured over the entire BIOS. In this architecture, the BIOS is composed of a single atomic entity. The entire BIOS is updated, modified, or maintained as a single component, and cannot be partially replaced.

In some embodiments, a measured portion of the BIOS is used to measure the CRTM-applicable components, and then store the measurement in PCR0 in the TPM, such as depicted by a static CRTM 158. In other embodiments, special processor microcode is used to perform the "dynamic" CRTM measurement and storage operations. Each of these techniques is performed in connection with inherent functionality provided by the TPM for such purposes.

In one embodiment, trusted firmware is assigned to locality 1. In one embodiment, the processor must be in a secure execution mode (SEM) to enter locality 1. For IA-32 processors, the SEM is entered by issuing an "SENTER" instruction to processor 102. While in secure execution mode, all existing and potential future processor users are blocked from accessing the processor. SEM also temporarily blocks all interrupts (the interrupts are redirected for subsequent handling after exiting SEM), including system management interrupts (SMIs), as depicted by an SMI redirection block 160.

In accordance with one aspect of SEM operation, processor 102 contains special instructions and microcode 162 to access certain devices coupled to LPC 142 via special bus cycle timing. These devices include TPM 136. This physical access scheme provides one level of security between data stored in TPM 136 and attacks on platform architecture 100.

A second level of security is provided by storing integrity metric data in platform configuration registers 156. PCR's 156 are employed for securely storing data in a manner where certain authentication information must be provided to TPM 136 in order to access a given PCR. In particular, the processor controls the locality, thus enabling certain PCR's from being accessed unless operating in the locality corresponding to those registers. Further security may be provided by sealing the locality in the measurement, as described below.

A PCR is a 160-bit storage location for discrete integrity measurements. All PCR registers are shielded-locations and are inside of the TPM. The decision of whether a PCR contains a standard measurement or if the PCR is available for general use is deferred to the platform specific specification.

A large number of integrity metrics may be measured in a platform, and a particular integrity metric may change with time and a new value may need to be stored. It is difficult to authenticate the source of measurement of integrity metrics, and as a result a new value of an integrity metric cannot be permitted to simply overwrite an existing value. (A rogue entity could erase an existing value that indicates subversion and replace it with a benign value.) Thus, if values of integrity metrics are individually stored, and updates of integrity metrics must be individually stored, it is difficult to place an upper bound on the size of memory that is required to store integrity metrics.

A PCR is designed to hold an unlimited number of measurements in the register. It does this by using a cryptographic hash and hashing all updates to a PCR. The pseudo code for this is:

$$PCR_i \text{ New} = \text{HASH}(PCR_i \text{ Old value} \| \text{value to add})$$

Updates to a PCR register are sometimes referred to as "extending" the PCR, while the data measured to the PCR is sometimes called the "extend." Since the resultant hash is dependant on existing data (the Old value), a chain of trust is formed that is incremented with each extend operation.

In one embodiment, PCR[0] provides the capability of being reset. Accordingly, hash-extend operations may be performed in a manner that produces PCR[0] values that are independent of previously stored register values. This is advantageous with respect to being able to store integrity metrics corresponding to a given platform environment, and then subsequently compare integrity metrics corresponding to a current platform environment with the given platform environment.

For example, in one embodiment of block 206, PCR[0] is reset, and a hash-extend is performed on the trusted BIOS boot block code (the core integrity measurement) using SHA-1 engine 142, with the result being stored in PCR[0]. In this context, the hash-extend operates on a reset register value (i.e., 0), and so the hash-extend simply reflects a hash of the trusted code. Thus, once loaded, the trusted BIOS boot block corresponds to one of the platform firmware environment components, while the hash of the component comprises an integrity metric corresponding to the platform environment, in this case the static CRTM. (it is noted that an integrity metric corresponding to a platform environment may reflect a single environment component (i.e., firmware/software component), or a combination of components used to form an environment that exists at the time the integrity metric is measured.)

Figure 2:
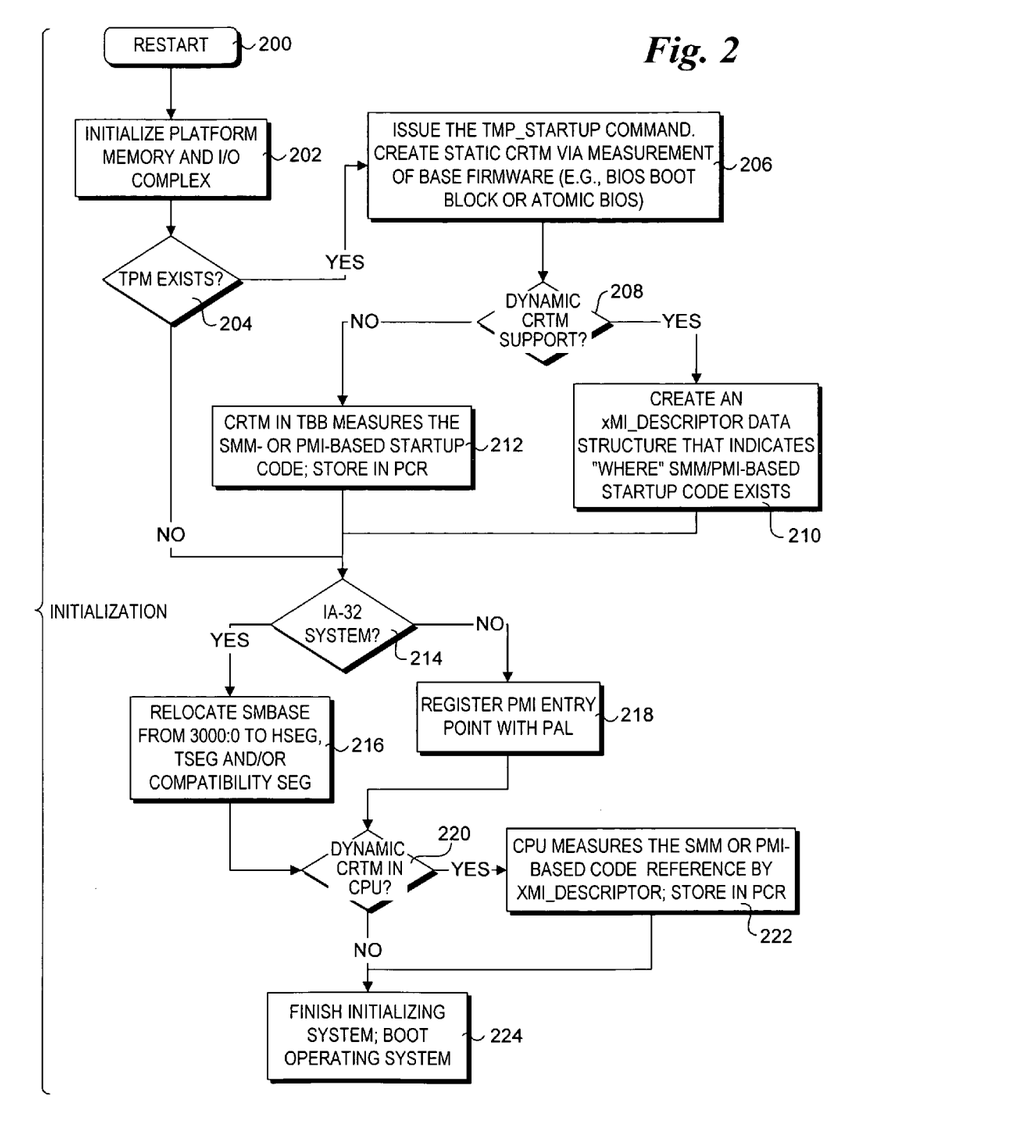
FIG. 2 is a flowchart illustrating operations and logic performed during initialization of a system to securely store measurements of trusted firmware, according to one embodiment of the invention.

Continuing with the flowchart of FIG. 2, in a decision block 208 a determination is made to whether the processor supports dynamic CRTM measurements. With the extension of the locality functionality that was added to the TPM by the version 1.2 specification, both a static CRTM and a dynamic CRTM may exist. A dynamic CRTM is derived from the processor itself. It is sealed during platform manufacturing in PCR[17], which may only be accessed while in locality 4; a sealed dynamic CRTM 164 is shown in FIG. 1.

If the answer to decision block 208 is YES, the logic proceeds to a block 210 in which an xMI_DESCRIPTOR data structure is created that indicates "where" the SMM or PMI-based startup code exists. Generally, SMM startup code relates to code that is executed by a "hidden" processor mode known as system management mode (SMM) on an IA-32 (Intel® Architecture, 32-bit) processor in response to a system management interrupt (SMI) event. Meanwhile, PMI (platform management interrupt) startup code relates to code that is executed in a somewhat analogous processor mode on an IA-64 processor, such as a member of the Intel® Itanium® family. For simplicity, both SMI and PMI signals are sometimes referred to herein as "xMI" signals. It will be understood that reference to an xMI signal means one of an SMI signal or a PMI signal.

As describe in further detail below, SMM- and PMI-based code comprises firmware that is loaded during the pre-boot into a reserved portion of memory. In block 210, the location at which the startup portion of this code is stored by the xMI_DESCRIPTOR. This portion of firmware is depicted as SMM or PMI startup code 132 in FIG. 1. For SMM code, the startup code is also referred to as the SMBASE.

If there is no dynamic CRTM defined for the processor, the CRTM in the trusted building block (TBB) measures the SMM- or PMI-based startup code in a block 212. In these embodiments, the startup code concerns the portion of the SMM- or PMI-based firmware that is fixed by the platform (e.g., at manufacture). There are firmware models that exist that enable third-party SMM and PMI code to be loaded for execution in response to corresponding SMI- and PMI-based events. This extensible portion of the SMM or PMI code, shown at 133, is not measured in block 212.

Continuing with the initialization process, each of the logic flows for a NO result of decision block 204, or completion of either of blocks 210 or 212, lead to a decision block 214. In this decision block, a determination is made to whether the system employs an IA-32 processor. If it does, the SMBASE (i.e., SMM-startup code) is relocated from an address of 0x3000:00 (its default address in firmware storage) to one of the H-segment, T-segment, and/or the compatibility segment in a block 216. If the answer to decision block 214 is NO, the processor is an IA-64 processor, and the PMI entry point is registered with the IA-64 processor abstraction layer (PAL) in a block 218.

Following the completion of either of blocks 216 and 218 (as applicable), a determination is made in a decision block 218 to whether there is dynamic CRTM defined for the processor. This is analogous to the determination made in decision block 208 discussed above. If the answer is YES, the processor microcode measures the PMI code or the SMM code referenced by the xMI_DESCRIPTOR created in block 210 above, as depicted in a block 220. The initialization of the system is then completing and the operating system is booted in a block 222. If the answer to decision block 220 is NO, the operation of block 222 is skipped. After the completion of loading the OS, the system is in OS-runtime.

Figure 3:
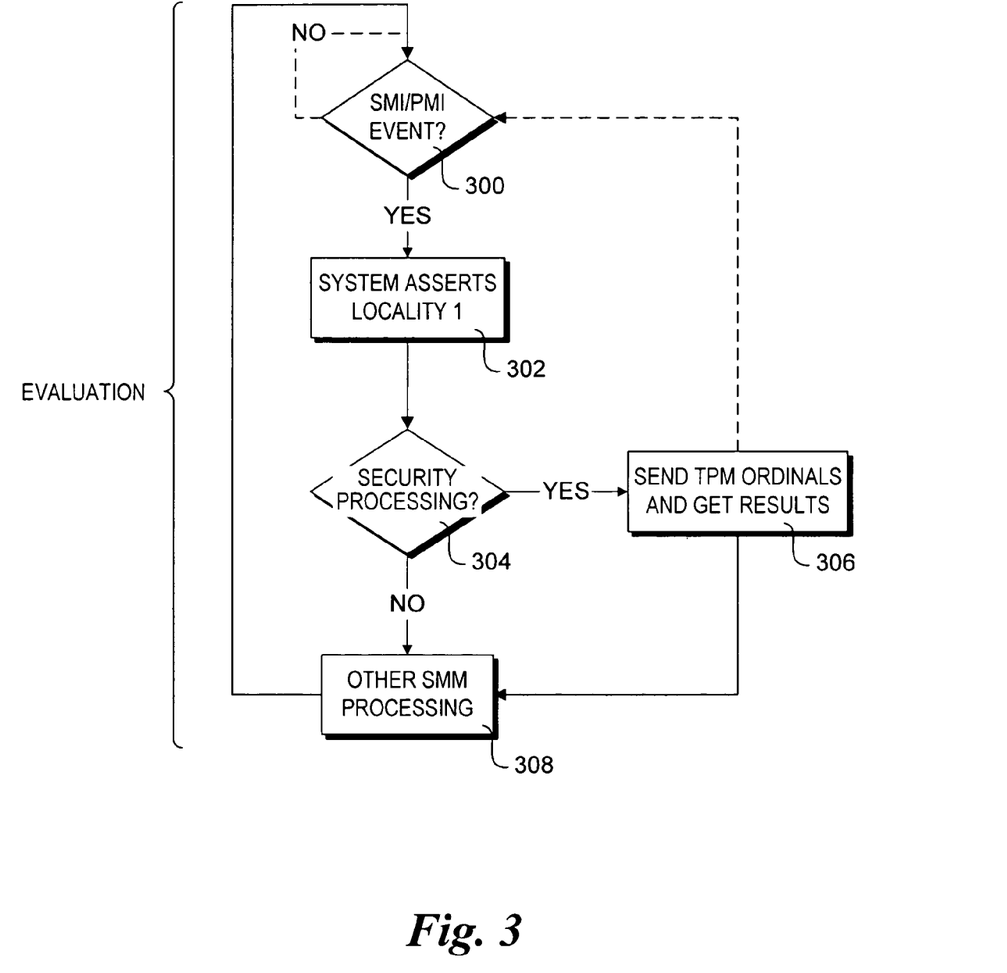
FIG. 3 is a flowchart illustrating operations and logic performed during an operating system (OS)-runtime evaluation, wherein secure firmware processing is effectuated, according to one embodiment of the invention.

Operations performed to ensure a secure firmware-processing environment during OS-runtime in accordance with one embodiment are shown in FIG. 3. The process begins with an SMI or PMI event. These events correspond to situations that cause the processor to switch from it current tasks to execute SMI or PMI-based code to service the event.

In response to the event, the system asserts locality 1 in a block 302. In practice, the processor first asserts locality 4, and then locality 1. In one embodiment, this is performed by issuing an SENTER command, causing execution control to pass to processor 102. The processor then executes microcode 162 to assert locality 4. The SMM or PMI startup code 132 then begins to execute. This startup code includes instructions to assert locality 1.

In a decision block 304 a determination is made to whether the event involves security processing. If it does, the logic flows to a block 306, wherein TPM ordinals are sent and results are returned. For example, the TPM ordinals may comprise a shared secret or certificate that is stored in either a PCR or a non-volatile storage means. This shared secret is extracted by the SMM or PMI code and provided to a challenger, who has requested authentication credentials. The results correspond to information sent back to the client being challenged (i.e., the platform hosting the TPM in which the credentials are sealed). After the completion of the operations in block 306, other SMM or PMI processing may be performed in a block 308.

Figure 4:
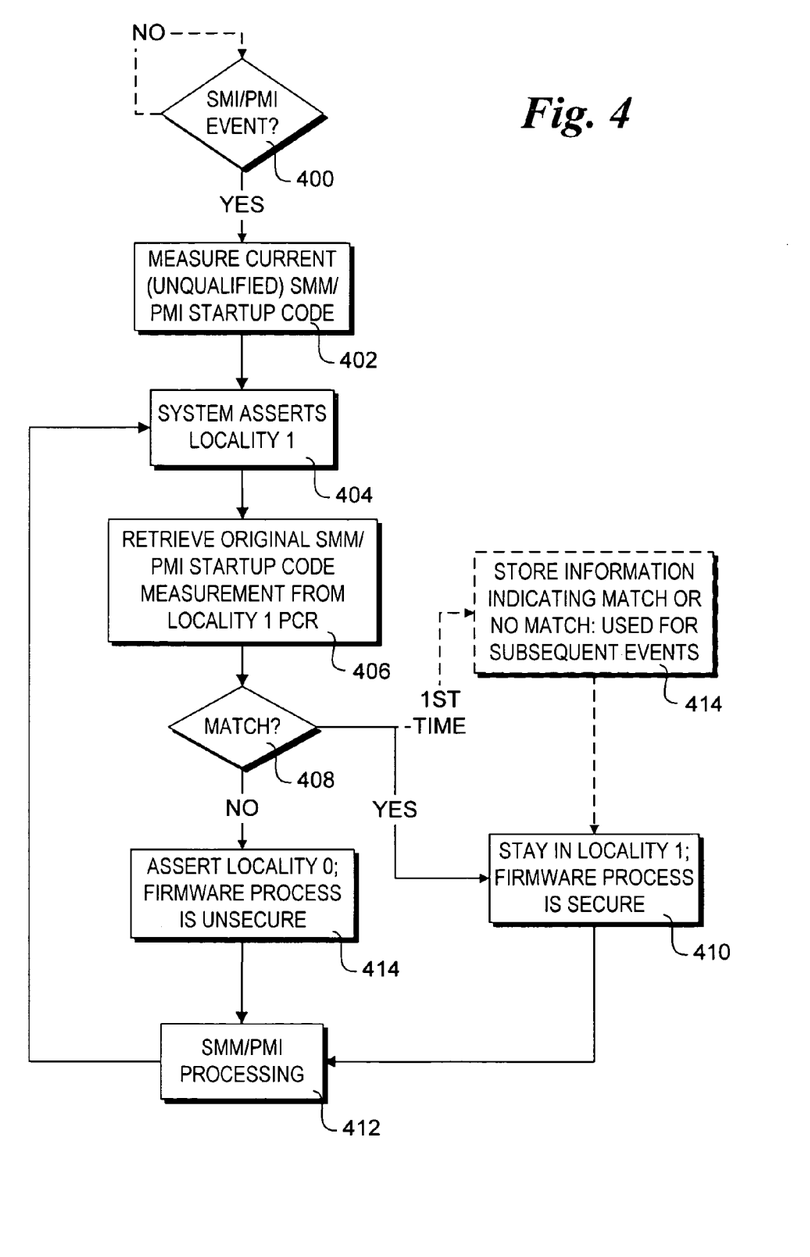
FIG. 4 is a flowchart illustrating operations and logic performed in response to a system management interrupt (SMI) or a platform management interrupt (PMI) event, wherein a trusted firmware process may be effectuated, according to one embodiment of the invention.

FIG. 4 shows a flowchart corresponding to one embodiment of a mechanism for performing trusted firmware processes during OS-runtime. It will be understood that the initialization operations of FIG. 2 or similar operations will have been performed during the pre-boot prior to booting and operating system and entering the OS-runtime phase. The process starts with an SMI or PMI event in a block 400. In response, the current SMM or PMI startup code is measured in a block 402. This measurement is analogous to the measurements performed in blocks 212 and 222 of FIG. 2. Prior to this measurement, the SMM or PMI startup code is deemed "unqualified." This is because there is no way to verify whether the current SMM or PMI startup code is trustworthy or not without some sort of qualification, such as the measurement performed in block 402.

In a block 404, the system asserts locality 1. The original SMM or PMI code measurement is then retrieved from a locality 1 PCR in a block 406. A determination to whether or not the SMM/PMI startup code measurements of blocks 402 and 406 match is made in a decision block 408. What this determination does, in effect, is verify that the current SMM or PMI startup code is identical to the startup code that was measured during the initialization operation of either block 212 or block 222. The startup code measured during the initialization is deemed trustworthy. This mechanism authenticates the trustworthiness of the current SMM or PMI startup code.

If the answer to decision block 408 is YES, indicating that startup code is trustworthy, the processing is allowed to continue in locality 1, as depicted by a block 410. Thus, all locality 1 privileges are made available to any subsequent SMM or PMI firmware processing performed in a block 412. If the SMM/PMI startup code does not match, the firmware is deemed untrustworthy. Thus, in a block 414, the locality 0 privilege level is asserted, and any subsequent SMM/PMI processing performed in block 412 may only operate in this locality, precluding the firmware from accessing locality 1 PCRs.

In the foregoing scheme, the operation of blocks 402, 406 and 408 may be performed on a one-time basis (e.g., once per OS-runtime session), or every time an SMI or PMI event occurs. In accordance with one embodiment of the one-time basis, information is stored on the platform (e.g., at a known memory location, in NVRAM, etc.) indicating that the SMM/PMI startup code is deemed trustworthy. This is depicted by an optional block 414.

Secure Processing Operations—Protected Security/Authentication Data

There are many advantages to being able to operate in a locality above locality 0. A principle advantage concerns storing security and authentication data. These type of data are generally referred to as "secrets," and include such objects as keys and authentication certificates. The embodiments described below employ both physical mechanisms and logical mechanisms to prevent unauthorized access to such secrets.

As discussed above, the asserted locality corresponds to a privileged access level within a hierarchy, wherein the higher the locality, the higher the hierarchy level and thus privilege. Also, the hierarchy level reflect trustworthiness of the process—the processes that are deemed the most trustworthy are allowed access to all operations, while less trustworthy processes are denied access to certain operations, based on the locality asserted for the processes.

Figure 5:
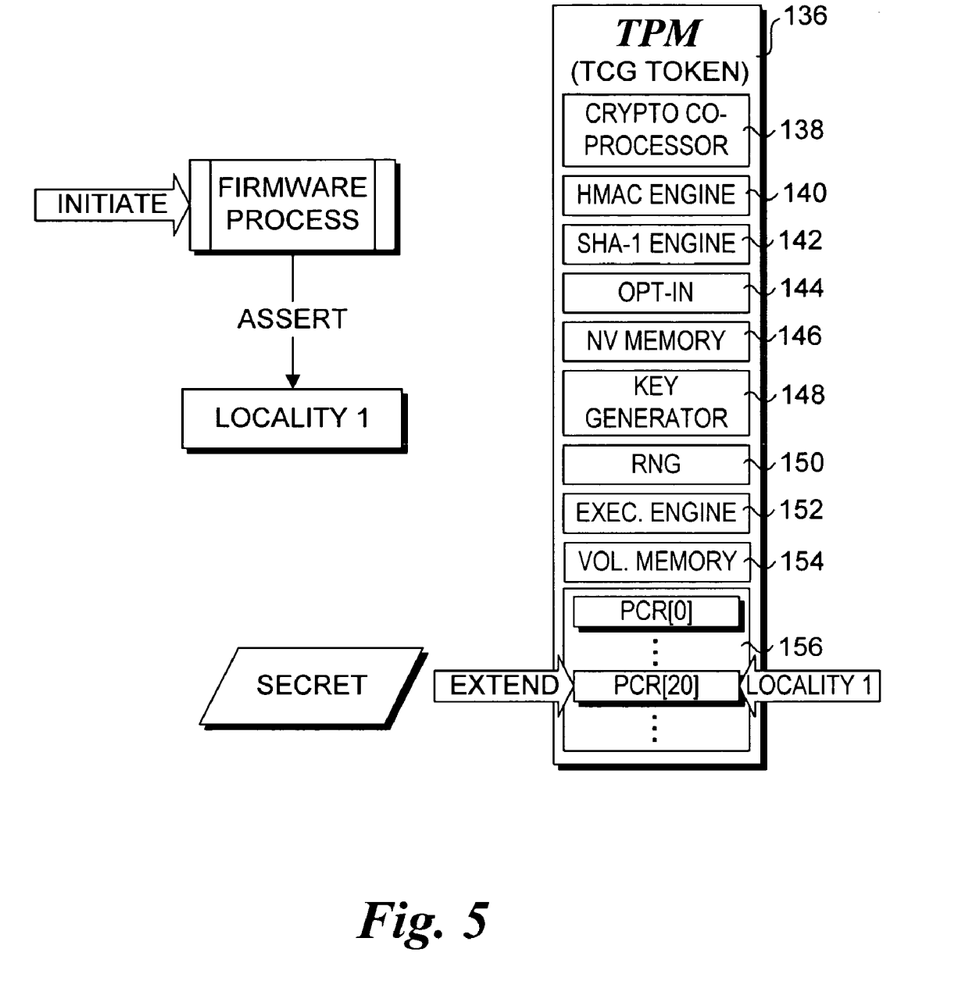
FIG. 5 is a schematic diagram illustrating a technique for storing a secret in a platform configuration register (PCR) having a trusted locality, according to one embodiment of the invention.

Under the most basic secret-protection scheme, secrets may be stored directly in PCR's corresponding to a processes' asserted locality. For example, as shown in FIG. 5, a secret 500 is stored to a PCR[20]. The following table defines the PCR usage for the various localities defined by the version 1.2 specification:

TABLE 1

| Locality Modifier | Entity in Control | PCRs that can be reset by the locality | PCR that can be extended by this locality |
|---|---|---|---|
| Any | Any Software Platform or Static OS | 15 | 15 |
| 0 | | None | 0–14, 23 |

TABLE 1-continued

| Locality Modifier | Entity in Control | PCRs that can be reset by the locality | PCR that can be extended by this locality |
|---|---|---|---|
| 1 | Dynamic OS | None | 20 |
| 2 | Dynamic OS | 20, 21, 22 | 20, 21, 22 |
| 3 | An auxiliary level of a trusted component | None | 18, 19, 20 |
| 4 | Hardware/ Dynamic RTM | 17, 18, 19, 20 | 17, 18 |

The combination of the TPM and the processor effectuate a physical security enforcement mechanism in the embodiment of FIG. 5. Each locality level "inherits" the privileges of all of the localities below it. Thus, the process for which the locality is asserted in FIG. 5 must have a locality of 1 or higher.

Designers of secure distributed systems, when considering exchange of information between systems, must identify the endpoints of communication. The composition and makeup of the endpoint is as important to the overall security of the system as is the communications protocol. As specified by the TCG, endpoints are minimally comprised of asymmetric keys, key storage and processing that protects protocol data items.

Classic message exchange based on asymmetric cryptography suggests that messages intended for one and only one individual can be encrypted using a public key. Furthermore, the message can be protected from tampering by signing with the private key. Keys are communication endpoints and improperly managed keys can result in loss of security. Additionally, improperly configured endpoints may also result in loss of security. The TPM aids in improving security by providing both key management and configuration management features (e.g., Protected Storage, Measurement and Reporting). These features can be combined to "seal" keys and platform configuration making endpoint definition stronger.

TCG defines four classes of protected message exchange; Binding, Signing, Sealed-Binding (a.k.a. Sealing) and Sealed-Signing. Binding is the traditional operation of encrypting a message using a public key. That is, the sender uses the public key of the intended recipient to encrypt the message. The message is only recoverable by decryption using the recipient's private key. When the private key is managed by the TPM as a non-migratable key, only the TPM that created the key may use it. Hence, a message encrypted with the public key, "bound" to a particular instance of a TPM.

Sealing takes binding one step further. Sealed messages are bound to a set of platform metrics specified by the message sender. Platform metrics specify platform configuration state that must exist before decryption will be allowed. Sealing associates the encrypted message (actually the symmetric key used to encrypt the message) with a set of PCR register values and a non-migratable asymmetric key.

A sealed message is created by selecting a range of PCR register values and asymmetrically encrypting the PCR values plus the symmetric key used to encrypt the message. The TPM with the asymmetric decryption key may only decrypt the symmetric key when the platform configuration matches the PCR register values specified by the sender. Sealing is a powerful feature of the TPM. It provides assurance that protected messages or secrets are only recoverable when the platform is functioning in a very specific known configuration.

Figure 6A:
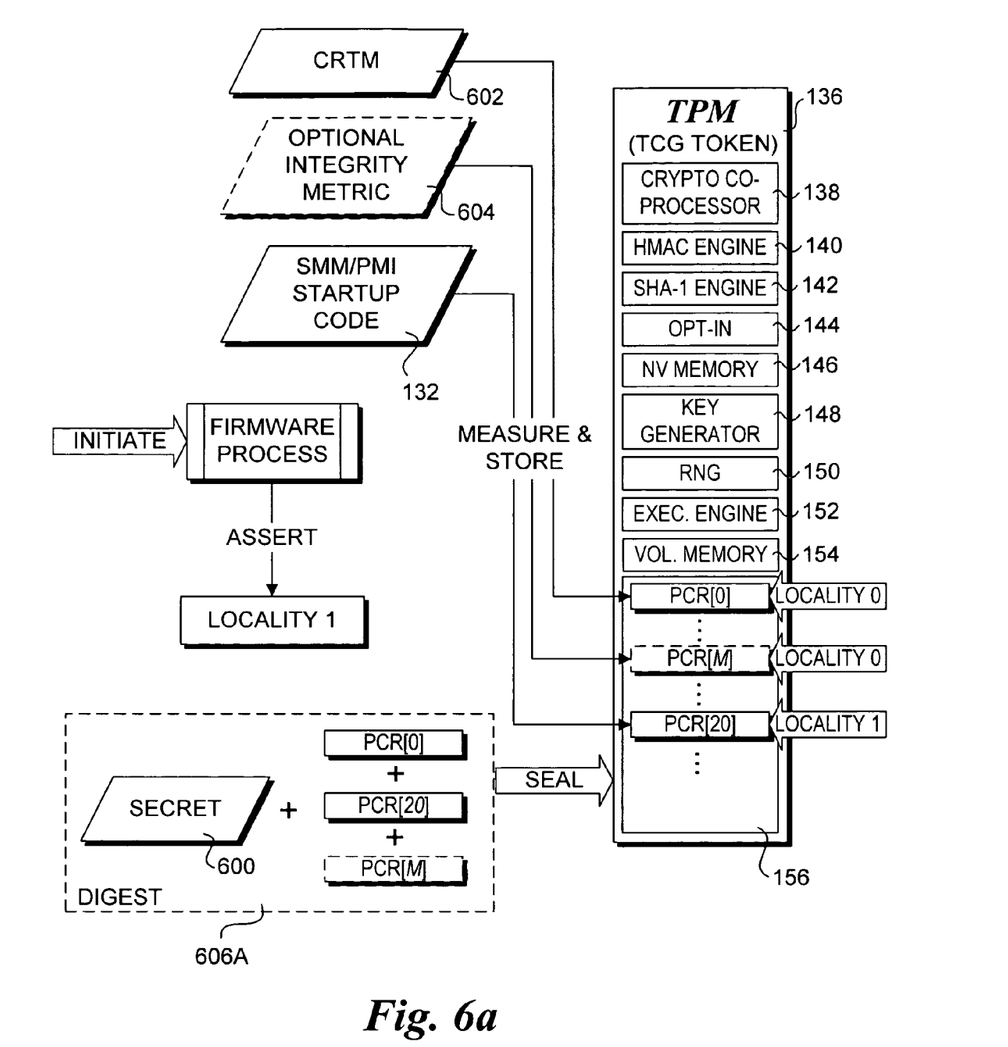
FIG. 6a is a schematic diagram illustrating a technique for sealing a secret to a trusted platform module (TPM), wherein the secret is contained in a digest including one or more integrity metric measurements, at least one of which is stored in a PCR having a trusted locality, according to one embodiment of the invention.
Figure 6B:
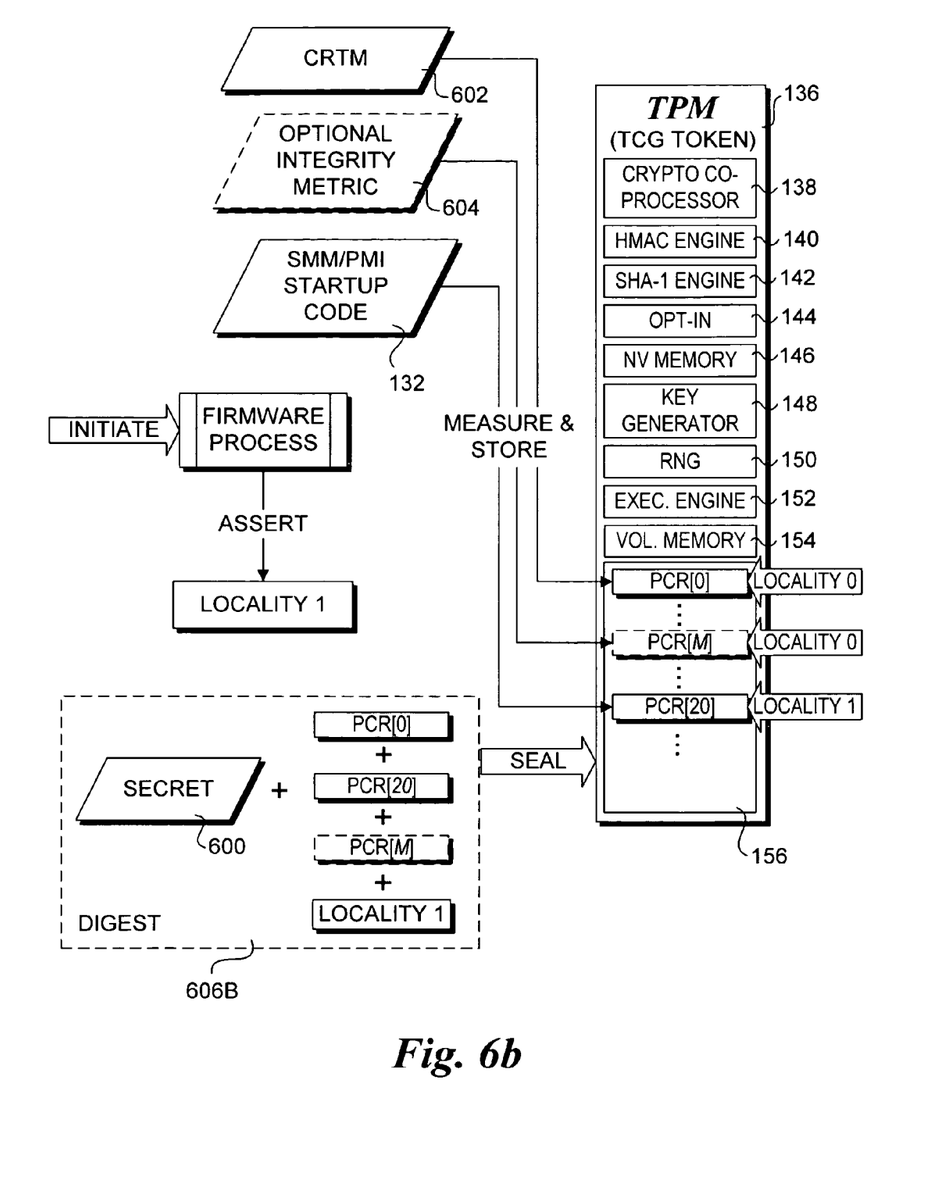
FIG. 6b is a schematic diagram illustrating a technique for sealing a secret to a TPM, wherein the secret is contained in a digest including one or more integrity metric measurements plus indicia identifying a locality that was asserted at the time the secret is sealed, wherein at least one of the measurements is stored in a PCR having a trusted locality, according to one embodiment of the invention.
Figure 6C:
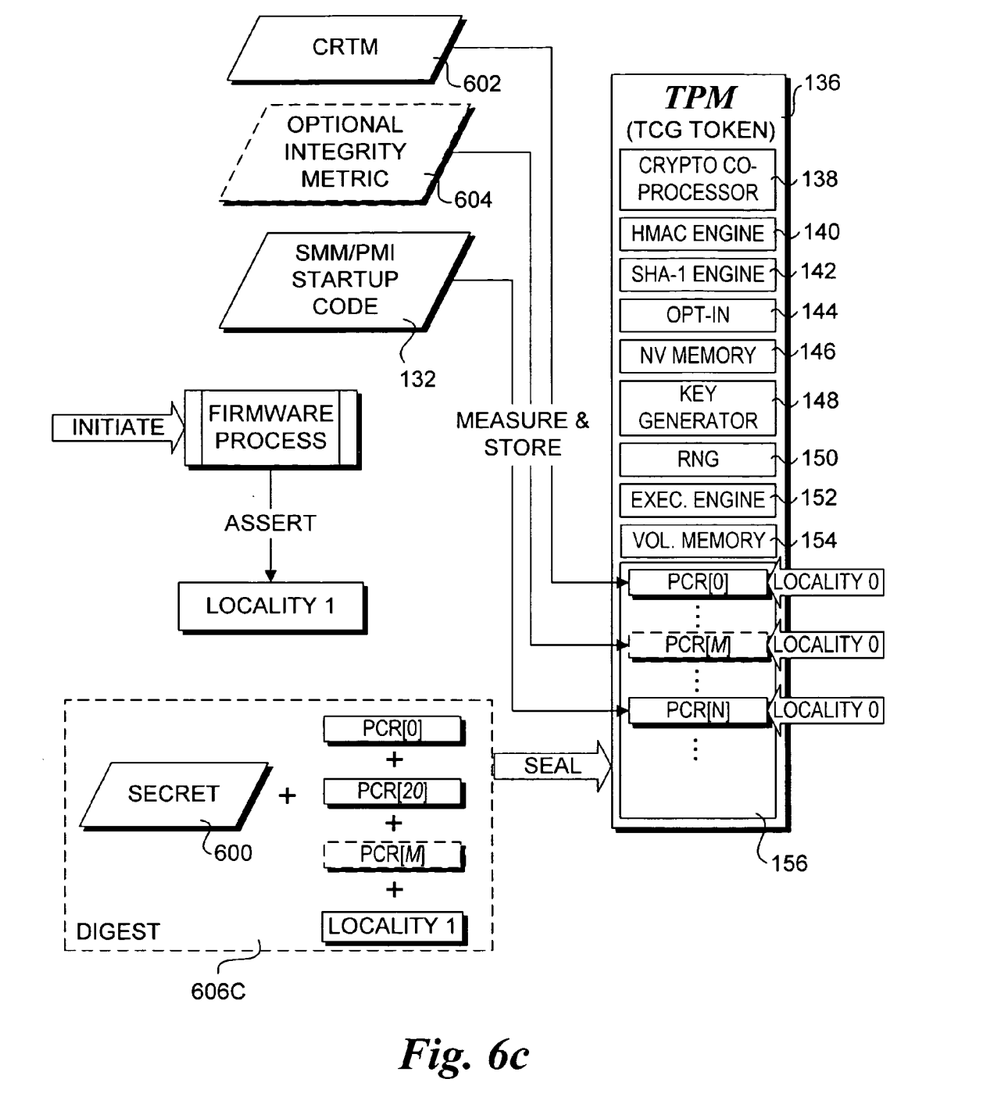
FIG. 6c is a schematic diagram illustrating a technique for sealing a secret to a TPM, wherein the secret is contained in a digest including one or more integrity metric measurements plus indicia identifying a locality that was asserted at the time the secret is sealed, according to one embodiment of the invention.

Each of the embodiments of FIGS. 6a, 6b, and 6c involve the use of sealing information to a TPM. The techniques used for these purposes may be used for stand-alone purposes, such as guaranteeing process security, or may be combined with operations involving another system, such as an attestation performed via a message exchange.

Sealing is effectuated via the TPM_Seal command. The SEAL operation allows software to explicitly state a future "trusted" configuration that the platform must be in for the secret (stored via the TPM_Seal command) to be revealed. The SEAL operation also implicitly includes the relevant platform configuration (PCR-values) when the SEAL operation was performed. The SEAL operation uses the tmpproof value to BIND a BLOB (Binary Large Object) to an individual TPM. To retrieve the secret, and UNSEAL operation is performed. If the UNSEAL operation succeeds, proof of the platform configuration that was in effect when the SEAL operation was performed is returned to the caller, as well as the secret data.

In response to the TPM_Seal command, external data is concatenated with a value of integrity metric sequence and encrypted under a parent key. The TPM_Unseal command may be subsequently used to decrypt the BLOB using the parent key and export the plaintext data if the current integrity metric sequence inside the TPM matches the value of integrity metric sequence inside the BLOB.

With reference to FIG. 6a, an embodiment is shown that seals a secret 600 to TPM 156 using one or more integrity metrics. During pre-boot, various platform integrity metrics are measured and stored in respective PCR's. In the illustrated embodiment, these include a CRTM 602, SMM/PMI startup code 132, and an optional integrity metric 604. The CRTM measurement is stored in PCR[0], while the SMM/PMI startup code measurement is stored in PCR[20]. The optional integrity metric 604 is stored in a PCR[M]. Each of PCR[0] and PCR[M] have a locality requirement of 0. PCR[20] requires a locality of 1 or greater. Thus, in order to store an integrity metric in PCR[20], locality 1 or greater must be asserted.

The secret 600 is concatenated with the values in PCR[0], PCR[M] (if an optional integrity measurement was made), and PCR[20]. The resulting digest 606 is then sealed to TPM 156 using the TMP_Seal command.

As discussed above, in order to access the secret 600, the platform configuration metrics that currently exist must match corresponding integrity metrics stored in PCR[0], PCR[M] (if an optional integrity measurement was made), and PCR[20]. As a result, the process must be in locality 1 to access the value in PCR[20], and the integrity metrics must match. Accordingly, the SMM/PMI startup code and the CRTM measurement (e.g., BIOS boot block 130) must be the same as corresponding components that existed at the measurements were stored in PCR[0], PCR[M] (optional), and PCR[20]. If the integrity metrics match, the secret 600 can be returned by issuing the TMP_Unseal command (with the appropriate command parameters).

The embodiment of FIG. 6b is analogous to that shown in FIG. 6a, except for it goes one step further. While the embodiment of FIG. 6a prevents locality 0 users from accessing secret 600 (no matter what the current integrity metrics are), it does not prevent users in localities 2 and 3 from accessing the secret. (It is noted that the locality 4 user, the processor, would have no motivation to access secret 600, although it would also not be precluded from accessing all of the PCR's for in which the trusted configuration integrity metric data are stored.)

The embodiment of FIG. 6b addresses this potential problem by including locality information 608 in a digest 606A identifying that locality 1 was asserted when the digest was sealed to TPM 156. Thus, this embodiment requires locality 1 to be asserted while the secret 600 is attempted to be retrieved using TPM_Unseal. As a result, users in any locality other than locality 1 may not access secret 600 under any condition.

The embodiment of FIG. 6c is analogous to that shown in FIG. 6b, except in this instance all of the integrity metrics are stored in locality 0 PCR's. One disadvantage with this approach is that the integrity metric in PCR[M] may be extended by a locality 0 user, which would cause a denial of service. (This deficiency may also exist with both of the embodiments of FIGS. 6a and 6b if an optional integrity metric is used and the value of PCR[M] is extended.)

It is noted that in each of the embodiments of FIGS. 6a-c, one or more of the integrity metrics may actually be used in generating the respective digests 600A, 600B, and 600C. It is further noted that optional integrity metrics may typically relate to other firmware components, such as Option ROMs. In this case, PCR[2] is designated for storing Option ROM code measurements, while PCR[3] is designated for storing Option ROM configuration measurements. It should be unlikely that a non-software locality 0 user would attempt to extend either PCR[2] or PCR[3], unless motivated by malicious intent. Furthermore, a rogue software entity would need to provide some mechanism for accessing the TPM in the first place, which again is not likely.

Many of the various operations performed during initialization and OS-runtime use of the embodiments described above are enabled via execution of firmware instructions. Thus, embodiments of this invention may be used as or to support a software/firmware program or module executed upon some form of processing core (such as the computer processor) or otherwise implemented or realized upon or within a machine-readable medium. A machine-readable medium includes any mechanism for storing or transmitting information in a form readable by a machine (e.g., a computer). For example, a machine-readable medium can include, for example, a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.). For instance, all or a portion of the firmware instructions may be loaded from a network store.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
   measuring a trusted original portion of firmware of a computer system, wherein the original portion of firmware comprises a startup portion of at least one of system management mode (SMM) firmware code or platform management interrupt (PMI) firmware code;
   securely storing the measurement of the trusted original portion of firmware;
   measuring an unqualified current portion of firmware during an operating system (OS)-runtime phase of the computer system;
   retrieving the measurement of the trusted original portion of firmware;
   comparing the measurement of the trusted original portion of firmware to the measurement of the unqualified current portion of firmware; and
   if the measurements match, executing the current portion of firmware as a trusted process.

2. The method of claim 1, wherein securely storing the measurement of the trusted portion of original firmware comprises storing the measurement in a trusted platform module (TPM).

3. The method of claim 2, wherein the trusted platform module is embodied as a hardware component.

4. The method of claim 2, wherein the trusted platform module is embodied as a software-based component.

5. The method of claim 1, further comprising:
   enforcing a locality-based security mechanism, wherein a processor must be operating in at least one of a given locality and a higher locality to retrieve the measurement of the trusted portion of firmware.

6. The method of claim 1, wherein measuring the unqualified current portion of firmware comprises measuring a current portion of at least one of system management mode (SMM) firmware code or platform management interrupt (PMI) firmware code.

7. The method of claim 1, further comprising performing a core root of trust measurement (CRTM).

8. The method of claim 7, wherein the CRTM is a static CRTM comprising a measurement of a trusted bootable portion of firmware.

9. The method of claim 7, wherein the CRTM is a dynamic CRTM measured via execution of processor microcode.

10. The method of claim 1, further comprising:
    creating a descriptor indicating where the trusted original portion of firmware is located.

11. A method, comprising:
    measuring at least one integrity metric corresponding to a trusted portion of an original firmware configuration of a computer system, wherein the trusted portion of the original firmware configuration includes a startup portion of at least one of system management mode (SMM) firmware code or platform management interrupt (PMI) firmware code;
    measuring an unqualified current portion of firmware during an operating system (OS)-runtime phase of the computer system;
    storing a respective measurement corresponding to each of said at least one integrity metric in a corresponding platform configuration register (PCR) of a trusted platform module(TPM); and
    sealing a secret to the TPM, the secret contained in a digest including the secret concatenated with the respective measurement(s) stored in the PCR(s), wherein a current firmware configuration includes a portion that matches the trusted portion of the original firmware configuration to unseal the secret attempting to unseal the secret sealed to the TPM during an operating system (OS)-runtime phase of the computer system.

12. The method of claim 11, further comprising:
    specifying a locality to be associated with a trusted firmware process; and concatenating the locality to the secret and the respective measurement(s) used to form the digest stored in the PCR(s).

13. The method of claim 11, further comprising:
    asserting a locality corresponding to an execution privilege level;
    storing at least one of the respective measurement(s) in a PCR that may be extended if a current execution privilege level matches or exceeds the locality of the execution privilege level that is asserted.

14. The method of claim 12, wherein the locality is locality 1.

15. The method of claim 11, wherein the trusted portion of the original firmware configuration includes a trusted boot block.

16. The method of claim 15, further comprising:
    measuring the trusted boot block to obtain a core root of trust measurement (CRTM).

17. The method of claim 11, wherein the portion of the firmware configuration includes a current portion of at least one of system management mode (SMM) firmware code or platform management interrupt (PMI) firmware code.

18. The method of claim 11, further comprising:
    executing firmware as a trusted process if the secret is unsealed, otherwise executing the firmware process as an untrusted process.

19. The method of claim 11, wherein the integrity metric is measured by executing microcode on a processor.

20. An article of manufacture, comprising:
    a machine-readable medium have instructions stored thereon, which when executed perform operations including:
    measuring a trusted portion of an original set of firmware components during a pre-boot phase of a computer system;
    storing the measurement of the trusted portion of the original set of firmware components in a trusted platform module (TPM) platform configuration register (PCR);
    measuring an unqualified portion of a current set of firmware components during an operating system (OS)-runtime phase of the computer system;
    determining if the measurement of the portion of the current set of firmware components matches the measurement of the portion of the original firmware components; and
    providing indicia to a processor to execute the portion of the current set of firmware components as a trusted process if the measurements match wherein each of the original and current sets of firmware components correspond to a portion of at least one of system management mode (SMM) firmware code or platform management interrupt (PMI) firmware code.

21. The article of manufacture of claim 20, wherein the machine-readable medium comprises further instructions to perform the operation of performing a core root of trust measurement (CRTM).

22. The article of manufacture of claim 20, wherein the machine-readable medium comprises further instructions to perform operations including:

sealing a secret to the TPM, the secret contained in a digest including the secret concatenated with the measurement of the trusted portion of the original set of firmware that is stored in the PCR.

23. The article of manufacture of claim 20, wherein the article comprises a flash device.

24. A system comprising:
a processor, including microcode instructions;
memory, operatively coupled to the processor;
a trusted platform module, operatively coupled to the processor; and
a flash device having firmware instructions stored thereon, which when executed on the processor perform operations including:
retrieving a first measurement stored in the TPM, the first measurement comprising a measurement of a trusted portion of the firmware instructions;
measuring an unqualified current portion of firmware instructions during an operating system (OS)-runtime phase of the system, the current portion of firmware instructions analogous to the trusted portion of the firmware instructions to obtain a second measurement, wherein each of the trusted and current portions of firmware instructions correspond to a portion of at least one of system management mode (SMM) firmware or platform management interrupt (PMI) firmware;
comparing the first measurement to the second measurement; and if the first and second measurements match, programming the processor to execute the current portion of firmware instructions as a secure process.

25. The system of claim 24, wherein the microcode instructions may be executed to perform the operations of generating a dynamic core root of trust measurement (CRTM) for the system.

26. The system of claim 24, wherein the microcode instructions may be executed to perform operations including:
measuring the trusted portion of the firmware instructions to produce the first measurement; and
storing the first measurement in a platform configuration register (PCR) of the TPM.

* * * * *